Aug. 19, 1969  H. H. MILLER ET AL  3,461,653
ADJUSTABLE SAFETY DEVICE
Filed Dec. 27, 1965

HARRY H. MILLER
CLERF W. GROVE
INVENTOR

BY *Thomas E. Sterling*

ATTORNEY

United States Patent Office 3,461,653
Patented Aug. 19, 1969

3,461,653
ADJUSTABLE SAFETY DEVICE
Harry H. Miller, 288 Standing Stone Ave., and Clerf W. Grove, R.F.D. 3, both of Huntingdon, Pa. 16652
Filed Dec. 27, 1965, Ser. No. 517,521
Int. Cl. A04d 35/26
U.S. Cl. 56—25.4        2 Claims

ABSTRACT OF THE DISCLOSURE

This invention is an adjustable safety bar attachable to power lawn mowers. The device acts as a bumper to prevent the lawn mower from being accidentally drawn over the user's foot. The device is comprised of two U-shaped bars adjustably attached to the lawn mower by screw means and extending outwardly therefrom.

The outer end portions of the U-shaped bars fit into a sleeve and are secured thereto by screw bolts extending through the sleeves to the U-shaped bars.

---

This invention relates generally to safety devices and more particularly to safety devices for use on a lawn mower.

The rotary power lawn mower has found great use in the efficient cutting of grass. This lawn mower is in general comprised of a fast rotating propeller-like cutting blade positioned parallel to the ground on which the mower is operating and driven by an above mounted gasoline engine. The engine and blade are usually mounted on a cartlike frame supported on the ground by wheels and having a handle extending therefrom by which the operator may push the mower over the lawn cutting a swath of grass. Although such lawn mowers are provided with guard plates which encircle the rotating cutting blade, they nevertheless constitute a danger to the operator in that his foot may slip under the blade guard and be injured by the rotating blade. Injuries of this type are frequent and usually very serious due to the great hazard of the sharp rotating cutting blade. In the operation of the mower on an upward or a downwardly extending slope, or upon even ground, it is very easy for the operator to jerk the mower over his foot or allow it to inadvertently roll there, thus allowing the rotating blade to amputate or seriously injure the contacted foot.

It is an object of this invention, therefore, to provide a safety devices which will prevent a lawn mower operator's foot from striking the cutting blades of a mower.

It is another object of this invention to provide a safety bar device for lawn mowers which may be easily adjusted to fit any size of lawn mower.

It is yet another object of this invention to provide a simple light and inexpensive safety device with interchangeable component parts.

It is still another object of this invention to provide a safety device which may be quickly and easily installed upon any size or configuration of lawn mower.

It is yet another object of this invention to provide a safety bar whose length may be adjusted quickly and easily by an attached sleeve.

Other objects and a fuller understanding of the invention may be had by referring to the following description and claims, taken in conjunction with the accompanying drawings, in which:

Figure 1:
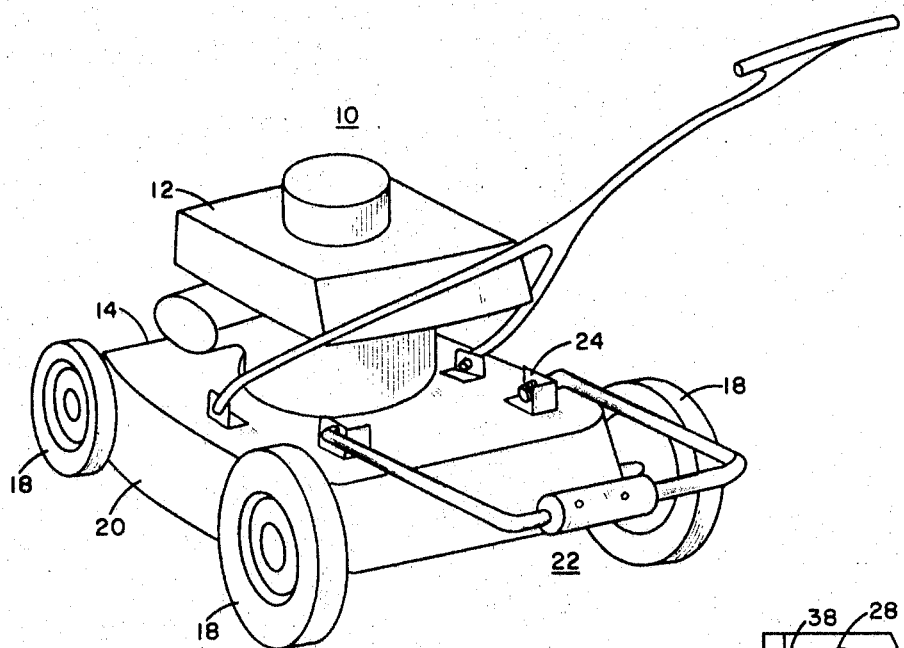
FIGURE 1 shows a perspective view of the lawn mower upon which this invention is attached.

With reference to the drawing, and in particular to FIGURE 1 there is shown a rotary type power lawn mower 10 with gasoline engine 12 mounted above supporting frame 14. A rearwardly extending handle 16 is attached to supporting frame 14 in such a manner that the operator may push the mower 10 over a lawn. Four wheels 18 are rotatably attached to supporting frame 14 so as to allow the mower a forward and rearward movement when pushed or pulled by the operator.

Engine 12 drives a horizontally positioned rotating cutting blade (not shown) positioned beneath supporting frame 14. This blade is driven at a very high angular velocity and cuts grass contacting it when the mower 10 is pushed over a lawn. Downwardly extending guard plate 20 is attached to the periphery of supporting member 14 and encircles the rotating cutting blade (not shown) to prevent objects from contacting the cutting blade. The embodiment 22 of this invention is attached to the rear portion of mower 10 beneath handle 16 and extends outwardly therefrom to prevent an operator pushing the mower 10 from putting his foot beneath guard plate 20 and in the path of the rotating blade (not shown).

Figure 4:
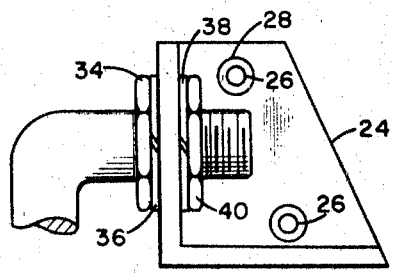
FIGURE 4 is a fragmentary view of the attaching bracket of FIGURE 2.
Figure 2:
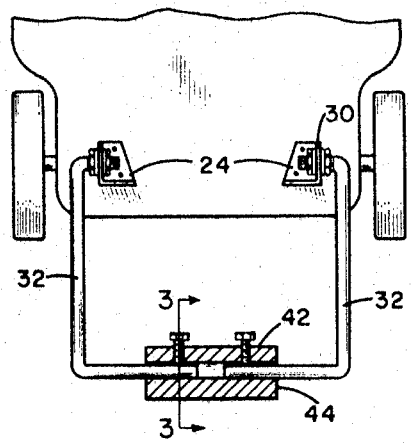
FIGURE 2 is a top view of an embodiment of this invention shown in FIGURE 1 with the adjustable sleeve in cross section.

Referring now to FIGURES 2 and 4, trihedral shaped brackets 24 are positioned on the lateral surface of the rear portion of supporting frame 14. Brackets 24 have holes 26 therethrough through which rivets 28 are placed securing the brackets 24 to the supporting frame 14. Bolts or other fastening devices can, of course, be used. The lateral side of brackets 24 has a hole 30 therethrough through which is placed the end portion of U-shaped safety bars 32 which extend to the rear of mower 10 approximately parallel to the ground. The shape of the safety bar 32 may also be such that it extends laterally to the outside of the wheels 18, as well as to the rear, so as to give better side protection to the operator. The end portion of safety bar 32 within the hole 30 is threaded so as to receive a nut 34 and a lock washer 36 on the outer lateral portion of bracket 24 and a lock washer 38 and nut 40 on the inner lateral surface of brackets 24. As may be seen by tightening nuts 34 and 40 so as to bear against lock washers 36 and 38 and brackets 24, the bar 32 may be rigidly positioned in any attitude. A cylindrical sleeve 42 having an opening 44 therethrough is positioned on the end portion of bars 32 so that these end portions pass into holes 44.

Figure 3:
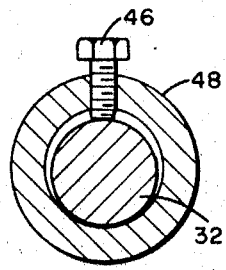
FIGURE 3 is a fragmentary cross sectional view taken along the line 3—3 of FIGURE 2.

Referring now FIGURES 2 and 3, studs 46 are screwed into internally threaded holes 48 passing through the lateral portion of sleeve 42 so that the end portion of studs 46 will bear against the end portion of bar 32. Thus by screwing studs 46 securely against bar 32, it may be seen that the sleeve of 42 will hold the two portions of bar 32 rigidly together. Alternatively, a number of spaced holes may be drilled through the end portion of bar 32, through which bolts (not shown) may be passed. Cylindrical sleeve 42 may be secured thereon by means of these bolts which pass through both bar 32, and cylindrical sleeve 42.

In operation, the brackets 24 are positioned on the top surface of supporting frame 14 and holes drilled through supporting frame 14 to mate with holes 26. Rivets 28 are then placed through holes 26 and supporting frame 14 and secured in position. Onto the threaded end portion of bar 32 is screwed nut 34 and placed lock washer 36. The threaded end portion of bars 32 is then placed through holes 30 and lock washer 38 and nut 40 screwed thereon and tightened until bars 32 are approximately horizontal and about five inches from the ground. Sleeve 42 had previously been slipped over the end portion of bar 32 and studs 46 loosened. When bars 32 are in position the studs 46 are tightened so as to bear against bars 32 securing sleeve 42 rigidly to bars 32.

Hence as may be seen the embodiment 22 of the invention extends outwardly from the rear portion of the mower 10 at approximately ankle height of the operator from the ground. Should the operator jerk the mower toward him, the rearmost portion of bar 32 or sleeve 42 will strike him in the ankle and prevent his foot from contacting the rotating blade (not shown). If the operator should slip, again, his ankle or foot would contact the embodiment 22 of this invention and his toes or other portions of his foot prevented from contacting the rotating cutting blade (not shown). Although this embodiment 22 of the invention has been described as positioned at the rear of the mower directly below the handle 16, it is also within the contemplation of this invention that similar embodiments 22 might be placed on the front or sides of the mower in like manner.

In practice all parts of the embodiment 22 are made of aluminum in the interest of lightness and noncorrosiveness. However it is within the contemplation of the invention that other materials can be used such as other metals, plastics, wood, etc. As may be seen, by the use of sleeve 42 the embodiment 22 of this invention may be made easily adjustable to almost all sizes of mowers. In practice the embodiment 22 has been used on mowers from 18 to 26 inches in diameter using a sleeve 42 which is eight inches long. Thus the sleeve 42 permits the embodiment 22 of this invention to be quickly adjusted to any size mower, thus eliminating the necessity of other bars or guards. The rear extension of bar 32 may be graduated in inch markings allowing the positioning of sleeve 42 instantaneously.

The embodiment 22 may be quickly installed on any mower by simply drilling appropriate holes in the supporting frame 14. Should the configuration of the mower 10 be such that the upper surface of supporting frame 14 is not suitable, the brackets 24 may be positioned on the side portion of the frame 14. Likewise the embodiment 22 may be mounted by the direct coupling of bar 32 to a vertical portion of a supporting frame 14 by drilling a hole in the vertical portion of the supporting frame sufficient to accommodate the threaded portion of bar 32. Nuts 34 and 40 and lockwashers 36 and 38 are thus positioned on either side of the vertical portion of supporting frame 14, tightened and the embodiment 22 thus made operative.

The embodiment 22 lends itself well to manufacturing and replacement in that many of the parts are identical and may be easily substituted. Likewise the embodiment 22 is light, does not occupy much space and hence is easy to store.

Although this invention has been described with a certain degree of particularity, it is understood that the present disclosure has been made only by way of example and that numerous changes in the details of construction and the combination and arrangements of parts may be resorted to without departing from the spirit and the scope of the invention as hereinafter claimed.

What is claimed is:

1. A safety device attachable and adjustable to varying sizes of rotating blade lawn mowers, said device having adjustable vertical height, comprising in combination:
   two brackets positioned upon said rotating blade lawn mower;
   two U-shaped bars pivotally attached to each of said two brackets and extending rearwardly therefrom, said means of pivotal attachment comprising in combination:
      a threaded section upon each of said U-shaped bars adjacent to said brackets;
      two nuts screwably attached to said threaded section, each nut positioned on either side of said bracket;
      two lock washers positioned upon said threaded section immediately adjacent to said bracket;
      whereby tightening of said nuts to bear against one another secures said U-shaped bars in fixed position;
   a sleeve slideably positioned upon the rearward end portions of said U-shaped bars;
   bolt means extending through said sleeve to bear upon the rearward end portions of said two U-shaped bars to hold said bars rigid.

2. The combination as claimed in claim 1 in which said sleeve has two holes extending therethrough, each hole having internal threads therein:
   said bolt means being comprised of two bolts positioned within said holes and extending therethrough so as to connect the end portion of each of said U-shaped bars, the screw portion of said bolts engaging the threads within said holes;
   whereby said U-shaped brackets and said sleeve are immovably positioned.

References Cited

UNITED STATES PATENTS

| | | | |
|---|---|---|---|
| 1,396,628 | 11/1921 | Ellis | 293—73 |
| 1,437,601 | 12/1922 | Lyon | 293—95 |
| 2,882,670 | 4/1959 | Stephens | 56—25.4 |
| 2,963,842 | 12/1960 | Estes | 56—25.4 |
| 2,982,079 | 5/1961 | Schesser | 56—25.4 |
| 2,991,914 | 7/1961 | Janssen | 56—25.4 |
| 3,093,947 | 6/1963 | Whitman | 56—25.4 |
| 3,106,812 | 10/1963 | McDonagh | 56—25.4 |
| 3,319,406 | 5/1967 | Miles | 56—25.4 |

ANTONIO F. GUIDA, Primary Examiner

PASQUALE A. RAZZANO, Assistant Examiner